United States Patent
Ellis et al.

(10) Patent No.: US 9,249,673 B2
(45) Date of Patent: Feb. 2, 2016

(54) TURBINE ROTOR BLADE PLATFORM COOLING

(75) Inventors: Scott Edmond Ellis, Easley, SC (US); Aaron Ezekiel Smith, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1070 days.

(21) Appl. No.: 13/341,018

(22) Filed: Dec. 30, 2011

(65) Prior Publication Data
US 2013/0171003 A1    Jul. 4, 2013

(51) Int. Cl.
*F01D 5/18* (2006.01)

(52) U.S. Cl.
CPC ............ *F01D 5/187* (2013.01); *F05D 2240/81* (2013.01); *Y02T 50/673* (2013.01); *Y02T 50/676* (2013.01)

(58) Field of Classification Search
CPC ............ F01D 5/12; F01D 5/14; F01D 5/142; F01D 5/143; F01D 5/22; F01D 11/005; F01D 11/006
See application file for complete search history.

(56) References Cited

U.S. PATENT DOCUMENTS

| | | | |
|---|---|---|---|
| 4,017,213 A * | 4/1977 | Przirembel | 416/97 A |
| 4,770,608 A | 9/1988 | Anderson et al. | |
| 6,065,931 A | 5/2000 | Suenaga et al. | |
| 6,071,075 A | 6/2000 | Tomita et al. | |
| 2005/0111980 A1 * | 5/2005 | Negulescu et al. | 416/97 R |
| 2007/0134099 A1 * | 6/2007 | Lee et al. | 416/193 A |
| 2010/0239432 A1 * | 9/2010 | Liang | 416/97 R |

FOREIGN PATENT DOCUMENTS

CN    86108861 A    8/1987

OTHER PUBLICATIONS

Unofficial English Translation of Chinese Office Action issued in connection with corresponding CN Application No. 201210585378.3 on Apr. 24, 2015.

* cited by examiner

*Primary Examiner* — Edward Look
*Assistant Examiner* — Christopher J Hargitt
(74) *Attorney, Agent, or Firm* — Mark E. Henderson; Ernest G. Cusick; Frank A. Landgraff

(57) ABSTRACT

A platform cooling arrangement for a turbine rotor blade having a platform at an interface between an airfoil and a root, the root including attachment means and a shank, wherein the platform comprises a suction side that includes a topside extending from an airfoil base to a suction side slashface, and wherein the platform overhangs a shank cavity. The platform cooling arrangement may include: a pocket formed in an underside region of the platform, the pocket comprising a mouth that fluidly communicates with the shank cavity; a manifold extending from the suction side slashface to a pressure side slashface, the manifold including a connection to the pocket; and cooling apertures that extend from connections made with the pocket and manifold to ports.

25 Claims, 8 Drawing Sheets

TURBINE ROTOR BLADE PLATFORM COOLING

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, 5, and 9) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement for a turbine rotor blade having a platform at an interface between an airfoil and a root, the root including attachment means and, extending between the attachment means and the platform, a shank, wherein, along the side of the platform that corresponds with a suction face of the airfoil, the platform comprises a suction side that includes a topside extending from an airfoil base to a suction side slashface, and wherein the platform overhangs a shank cavity formed in the shank. The platform cooling arrangement may include: a pocket formed in an underside region of the platform, the pocket comprising a mouth that fluidly communicates with the shank cavity; a manifold extending from a first end near the suction side slashface to a second end near a pressure side slashface of the platform, the manifold including a connection to the pocket near the first end of the manifold; and cooling apertures formed within the platform that extend from a connection made with one of the pocket and the manifold to ports formed within one of the suction side slashface and an aft edge of the platform.

The present invention further includes a method of manufacturing a platform cooling arrangement in a turbine rotor blade having a platform at an interface between an airfoil and a root, the root including attachment means and, extending between the attachment means and the platform, a shank, wherein, along the side of the platform that corresponds with a suction face of the airfoil, the platform comprises a suction side that includes a topside extending from an airfoil base to a suction side slashface, and wherein the platform overhangs a shank cavity formed in the shank. The platform cooling arrangement may include: forming a pocket in an underside region of the platform, the pocket comprising a mouth that fluidly communicates with the shank cavity; machining via a drilling process a manifold, the manifold extending linearly and in an approximate circumferential direction from the pressure side slashface to the suction side slashface, the linear path of the manifold being predetermined such that an offset is maintained from the aft edge of the platform and the manifold bisects the pocket along the way; machining cooling apertures within the platform that extend from a connection made to the pocket to corresponding ports formed on the suction side slashface; and machining cooling apertures within the platform that extend from a connection made to the manifold to a corresponding ports formed in an aft edge of the platform.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
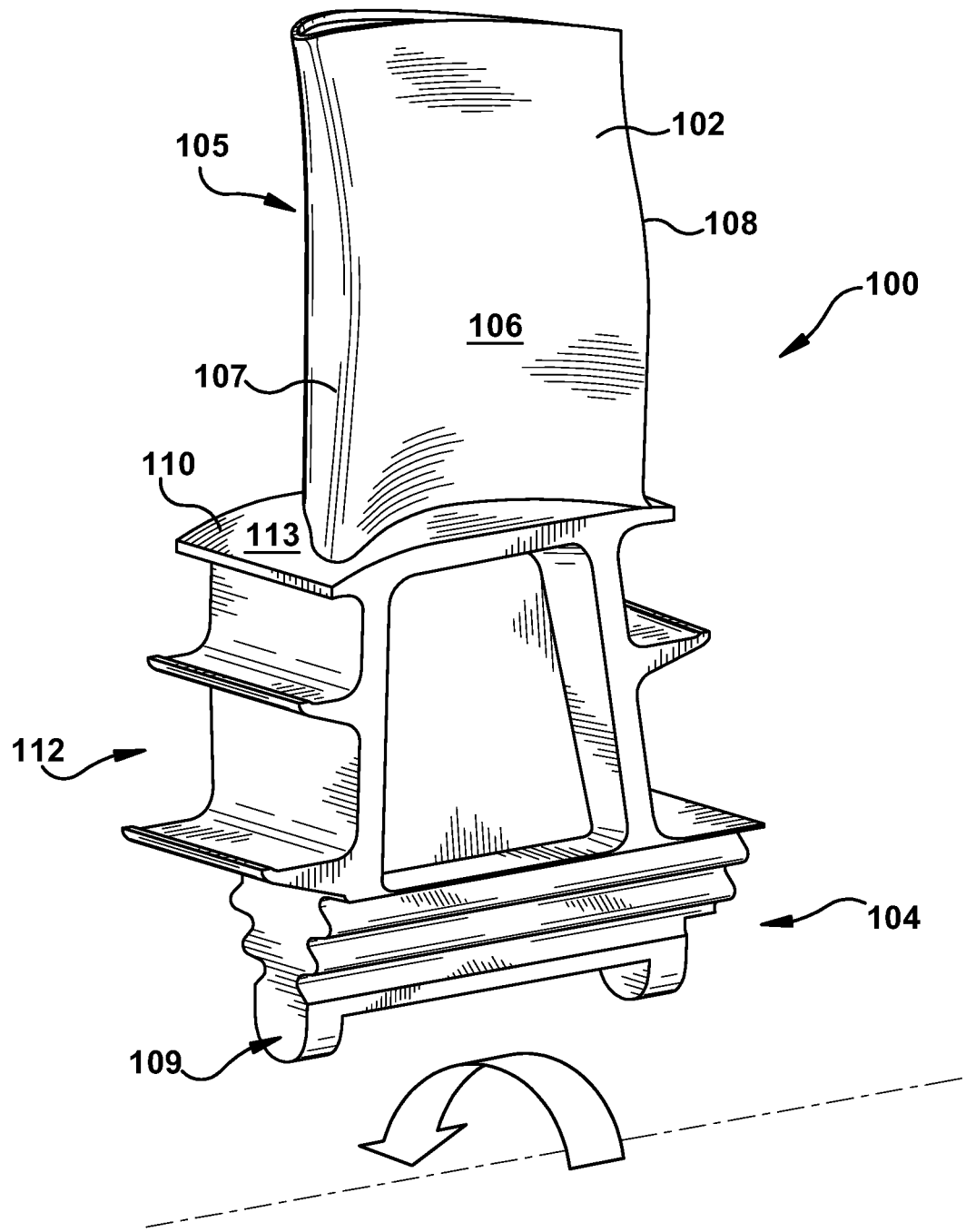
FIG. 1 illustrates a perspective view of an exemplary turbine rotor blade in which embodiments of the present invention may be employed.
Figure 2:
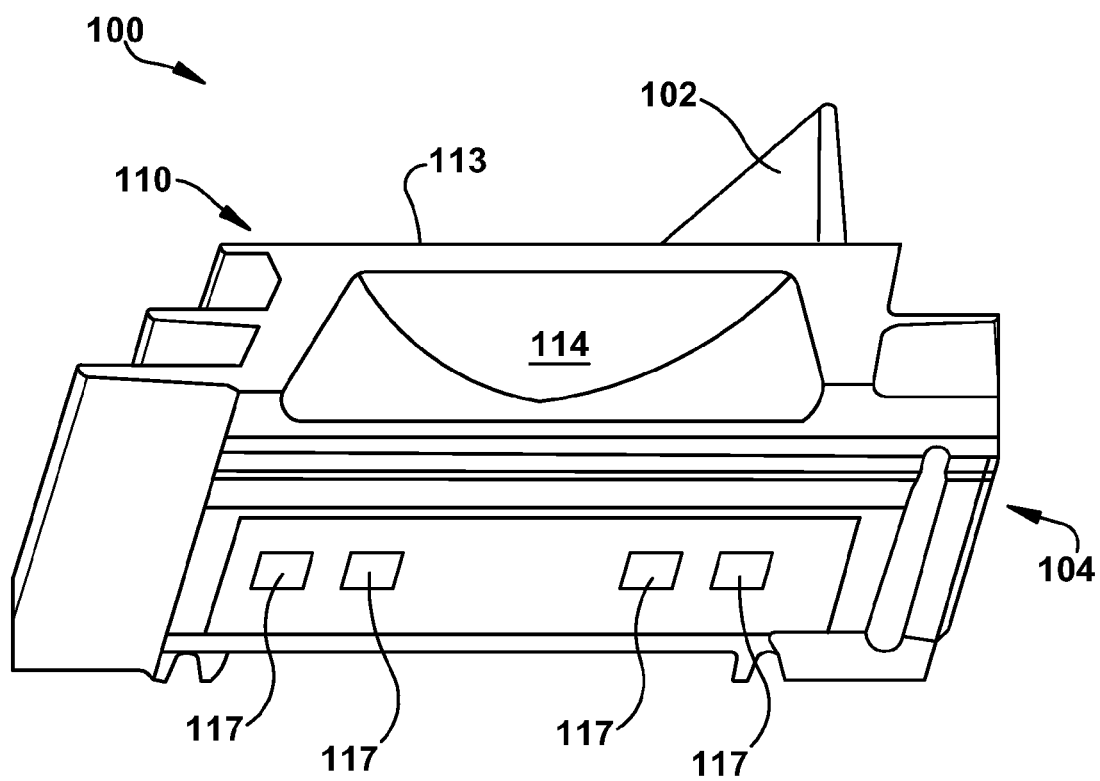
FIG. 2 illustrates an underside view of a turbine rotor blade in which embodiments of the present invention may be used.
Figure 3:
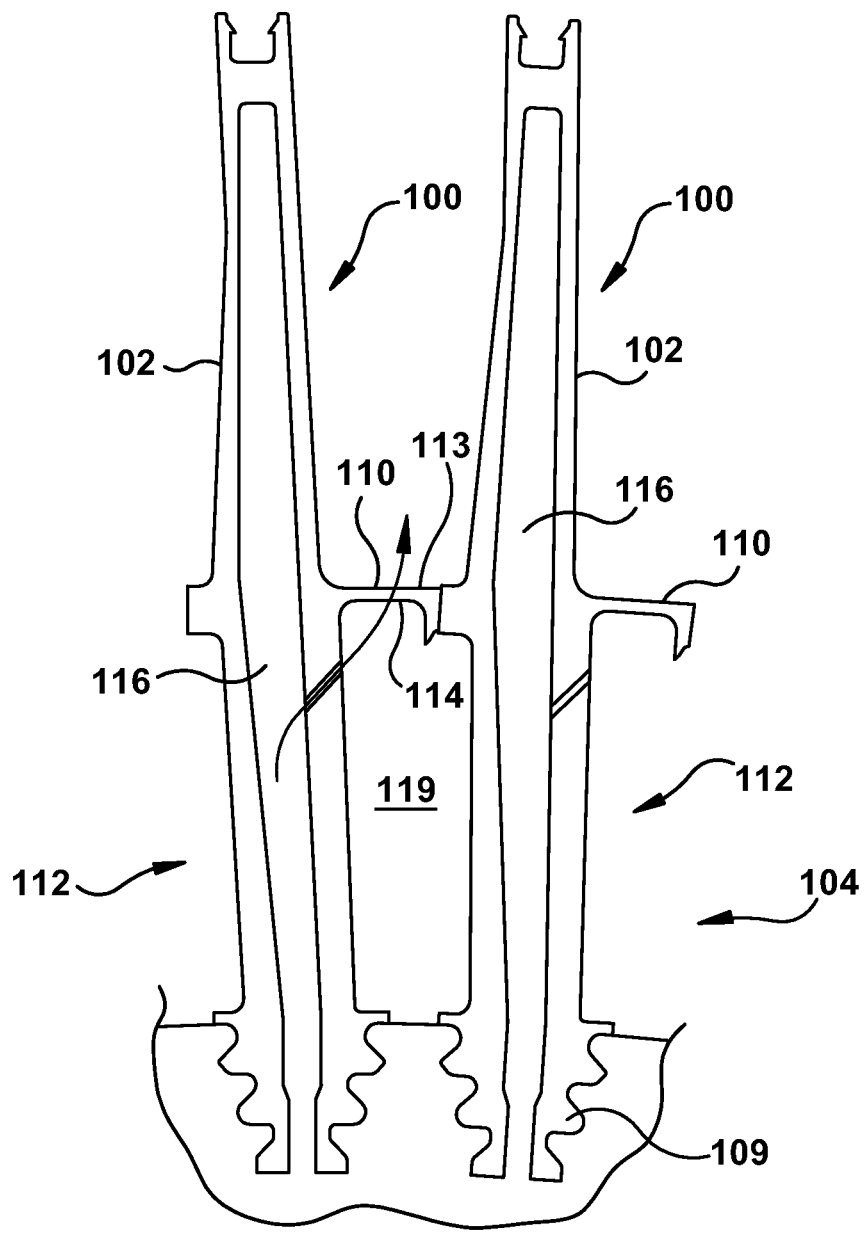
FIG. 3 illustrates a sectional view of neighboring turbine rotor blades having a cooling system according to conventional design.
Figure 4:
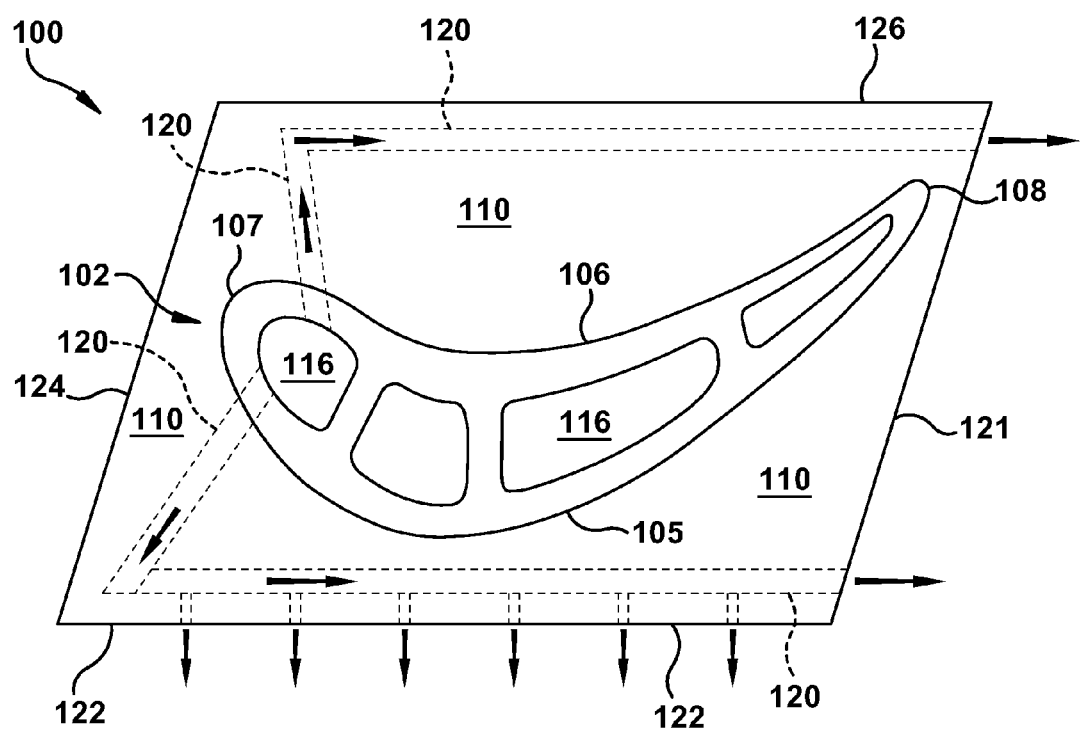
FIG. 4 illustrates a top view of a turbine rotor blade having a platform with interior cooling channels according to conventional design.
Figure 5:
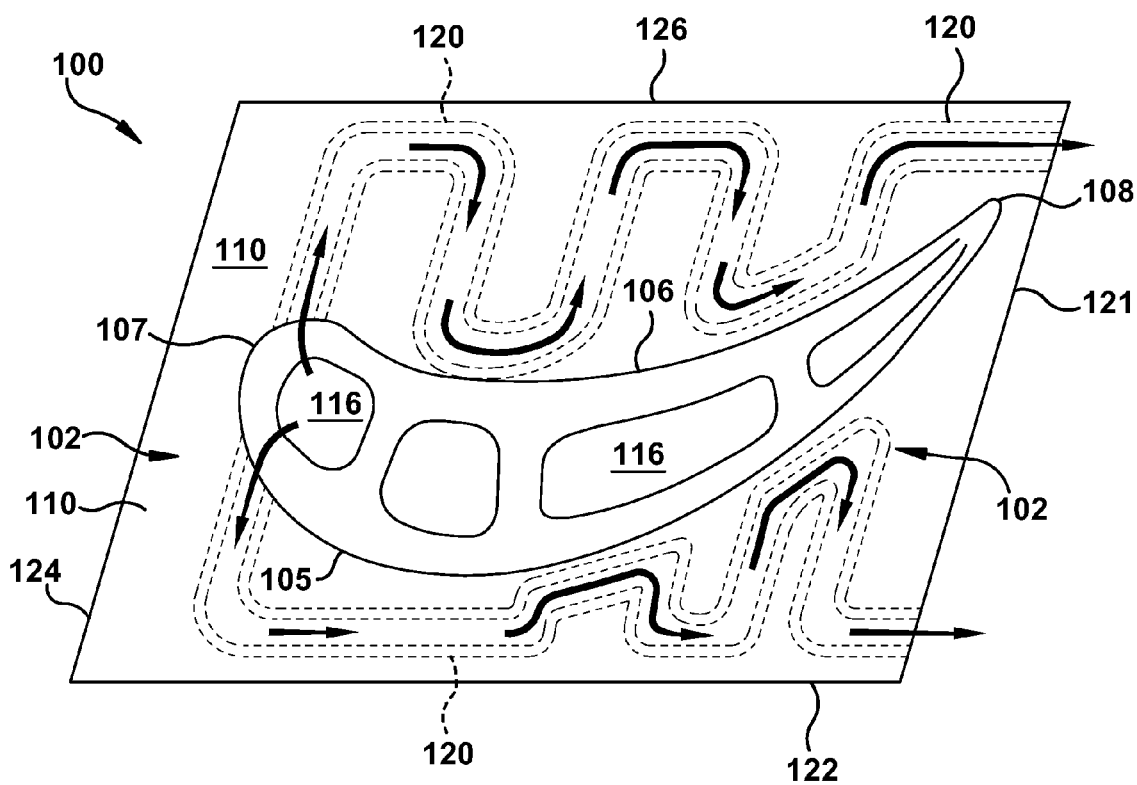
FIG. 5 illustrates a top view of a turbine rotor blade having a platform with interior cooling channels according to an alternative conventional design.

As discussed above in relation to FIG. 3, turbine rotor blades may be cooled by pressurizing a shank cavity 119 with coolant. More specifically, the present invention provides cooling methods and systems by which pressurized coolant within the shank cavity 119 may be efficiently and effectively employed to cool difficult regions within the platform 110.

Figure 6:
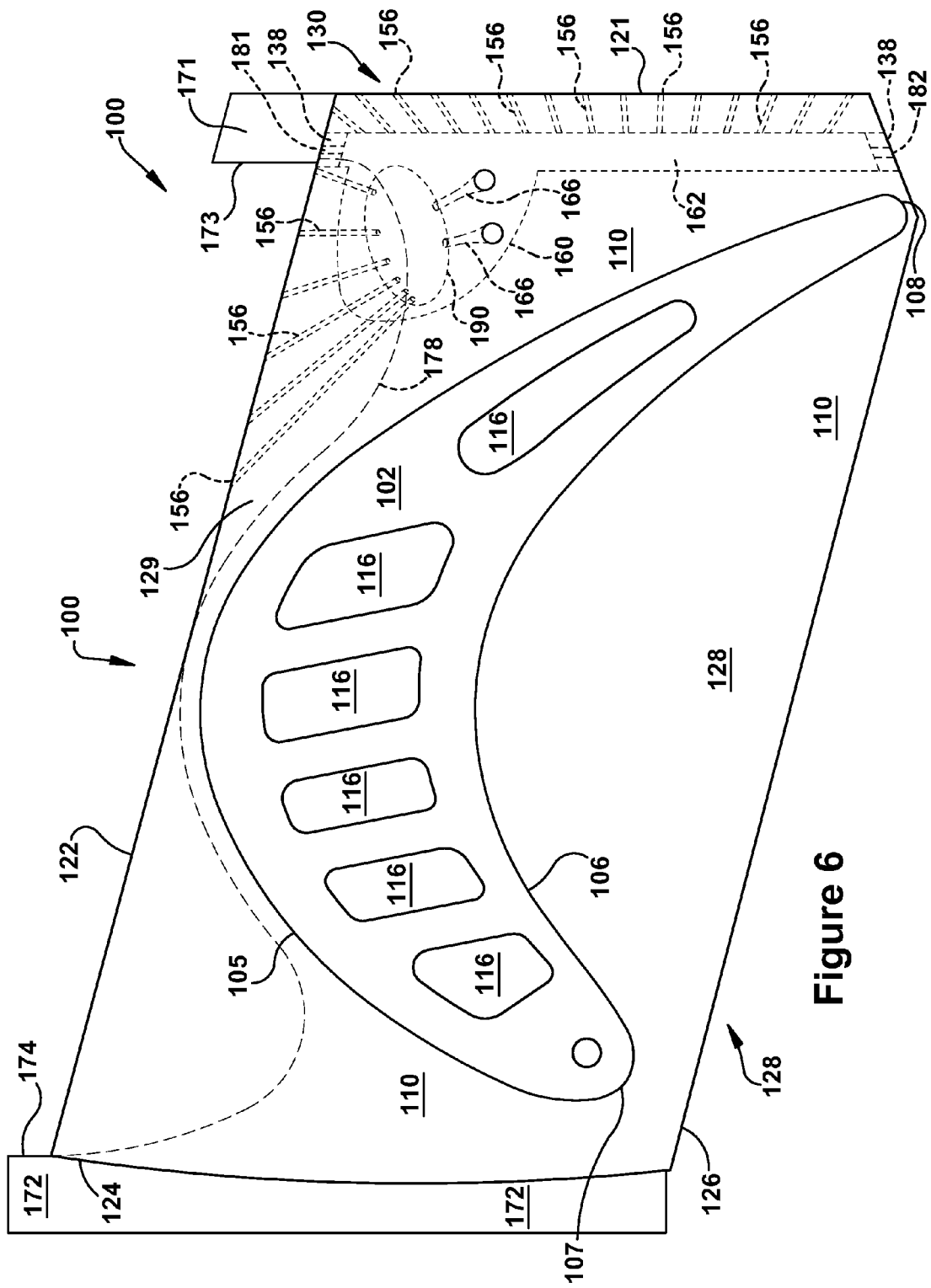
FIG. 6 illustrates a top with partial cross-sectional view of a turbine rotor blade having a platform cooling arrangement according to an exemplary embodiment of the present invention.
Figure 7:
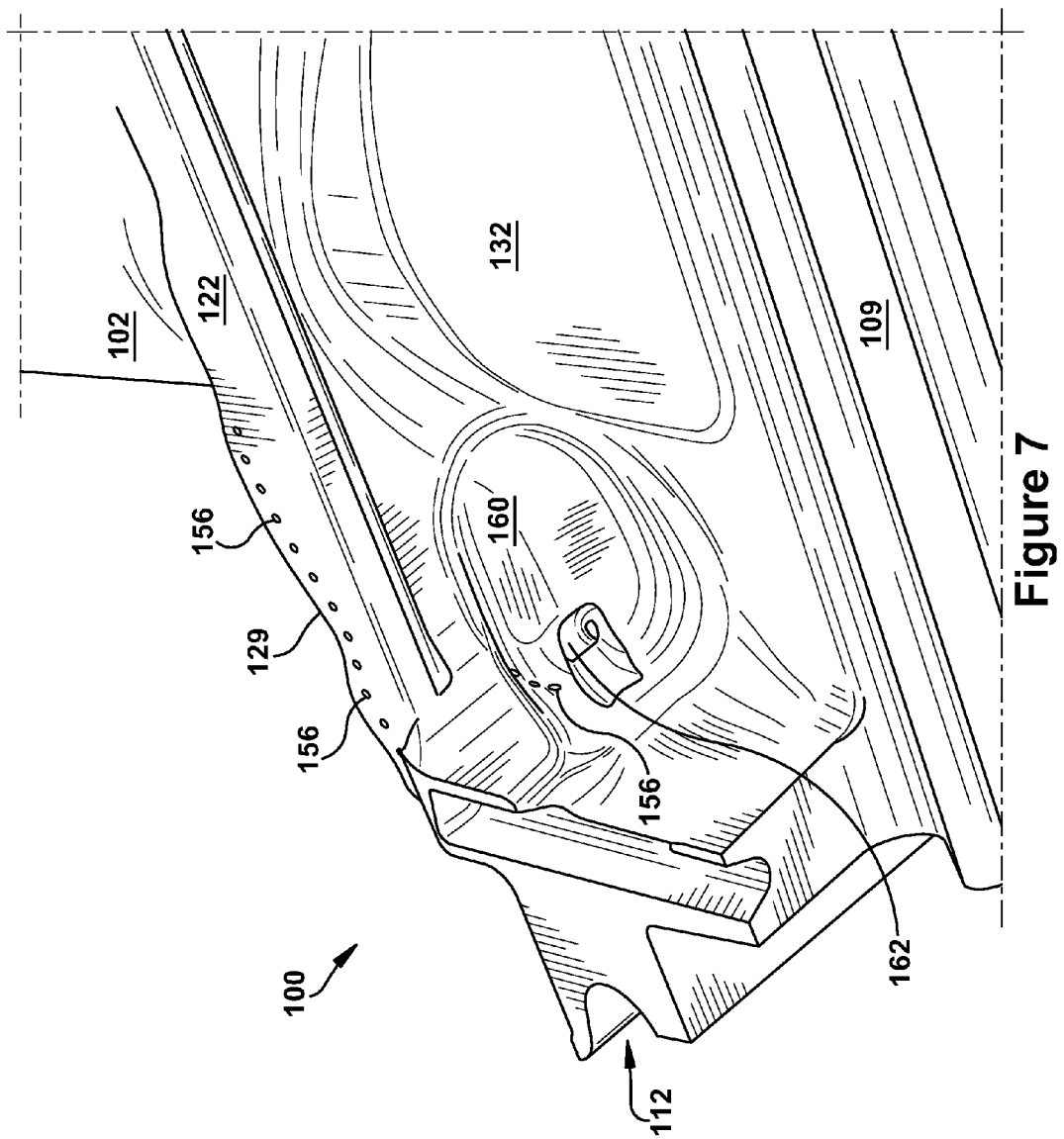
FIG. 7 illustrates a perspective view from within the shank cavity of a rotor blade having a platform cooling arrangement and underside pocket according to an alternative embodiment of the present invention.
Figure 8:
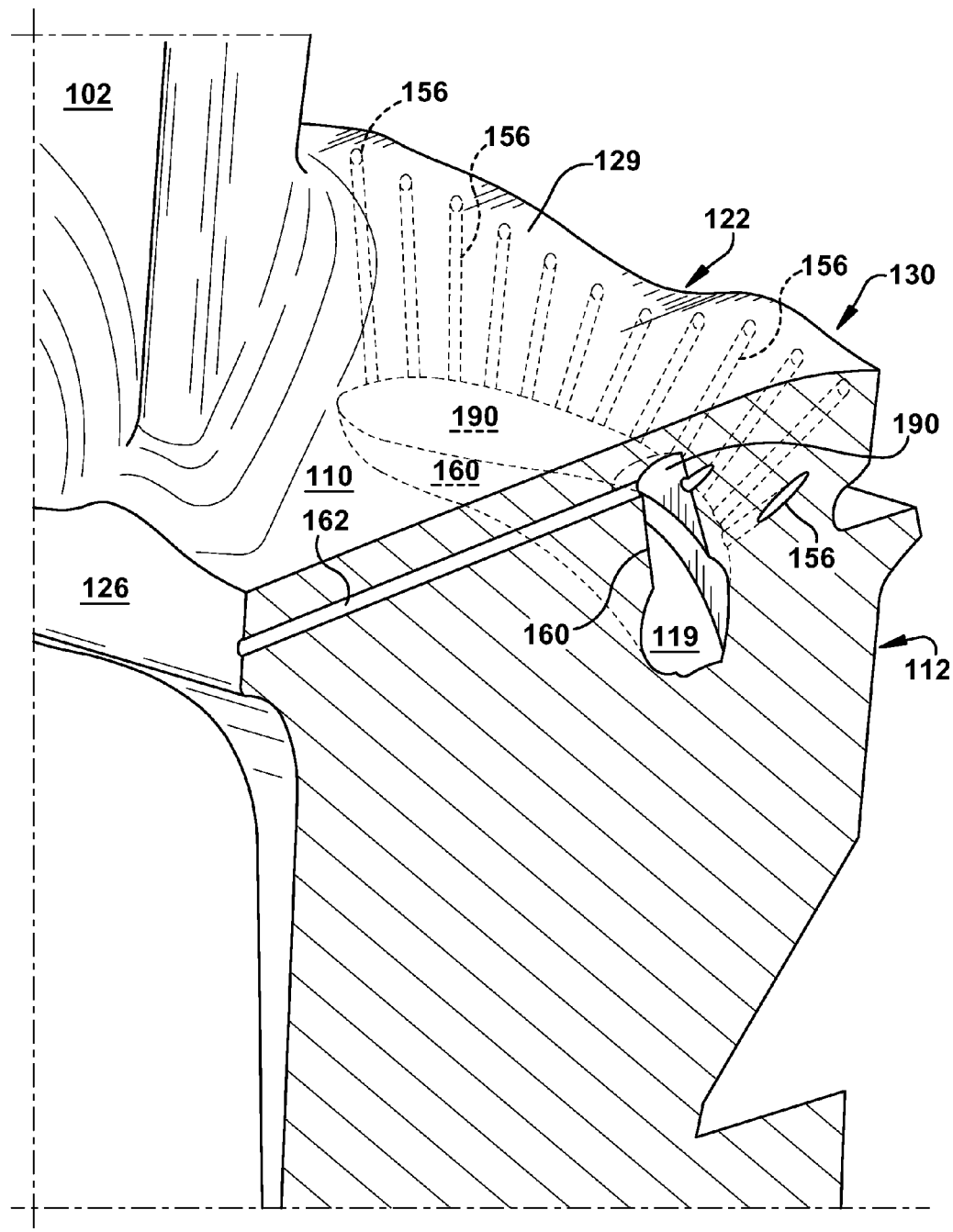
FIG. 8 illustrates cross-sectional view of the turbine rotor blade having a platform cooling arrangement according to an alternative embodiment of the present invention.

Referring again to the figures, several views of exemplary embodiments of the present invention are provided. FIGS. 6 through 8, in particular, illustrate turbine rotor blades 100 having a platform cooling configuration 130 according to preferred embodiments. As shown, the blade 100 includes a platform 110 residing at the interface between an airfoil 102 and a root 104. At the side of the platform 110 that corresponds with a pressure face 106 of the airfoil 102, it will be appreciated that the platform 110 may have a planar topside 113, which extends between the airfoil 102 and the pressure side slashface 126. The platform 110 may have a planar underside 114 disposed at an inner radial surface. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform 110 a flat appearance.) At the side of the platform 110 that corresponds with the suction face 106 of the airfoil 102, it will be appreciated that the platform 110 includes a platform suction side 129. On this side, the topside 113 of the platform 110 extends from the airfoil 102 to a suction side slashface 122, and has an underside 114 along an inboard surface.

Generally, the present invention includes a series of convective passages formed within the suction side 129 of the platform 110 and methods by which these convective passages may be fabricated. The invention proposes the creation of an underside pocket or pocket 160. Specifically, in certain embodiments, the platform cooling configuration 130, as shown in FIGS. 6-8, includes: a pocket 160 formed in the underside 114 area of the platform 110, the pocket 160 including a mouth that fluidly communicates with the shank cavity 119; an aft manifold or manifold 162 extending from a first end near the suction side slashface to a second end near a pressure side slashface 126 of the platform 110, the manifold 162 including a connection to the pocket 160 near the first end of the manifold 162; and several cooling apertures 156 formed within the platform 110 that extend from a connection made with the pocket 160 and/or the manifold 162 to ports formed within the suction side slashface 122 and/or an aft edge 121 of the platform 110. In general, the pocket 160, the manifold 162, and the cooling apertures 156 may be configured such that pressurized coolant from the shank cavity 119 is encouraged to enter the pocket 160, flow from the pocket 160 into the cooling apertures 156 that connect directly to the pocket 160, flow from the pocket 160 into the manifold 162, flow from the manifold 162 into the cooling apertures 156 that connect directly to the manifold 162, and exit the platform 110 through the ports formed along the suction side slashface 122 and the aft edge 121 of the platform 110. In certain embodiments, several film cooling aperture 166 also may be formed that connect the pocket 160 to ports formed through the topside 113 of the platform to enhance cooling.

In certain embodiments, the pocket 160 is formed inboard of the aft, suction side corner of the platform, as illustrated in FIG. 6. The pocket 160 may be machined from existing regions within the shank 112 and the platform 110, thereby deepening the shank cavity 119 and extending it toward the topside 113 of the platform 110. As shown in FIG. 7, an unmodified shank reference line 178 shows the typical position of the shank 112 before the formation of the pocket 160. The pocket 160 may include a location just inboard of an aft half of the suction side 129 of the platform 110. The mouth of the pocket 160 may be configured to provide a wide opening that fluidly communicates with the shank cavity 119. From the mouth, the pocket 160 may include a smooth, narrowing contour as it extends into the shank 112 and platform 110.

The pocket 160 may include a feed region 190, which may be described as the ceiling portion of the pocket 160. Specifically, the feed region 190 maintains an outboard position relative to other regions of the pocket 160, i.e., the feed region 190 is radially outward of (or further from) the axis of the turbine engine than the other areas within the pocket 160). The feed region 190 may extend into the platform 110 such that it resides in relative close proximity to the topside 113 of the platform 110. In certain embodiments, the ports spaced along the suction side slashface 122 may connect to the feed region 190 of the pocket 160 via the cooling apertures 156. The radial height of the feed region 190 may be configured to allow the cooling apertures 156 to make this connection while maintaining an approximate constant radial height as each cooling aperture extends toward a respective port formed in the suction side slashface 122. The constant radial height of the cooling apertures 156 may correspond to a desired offset from the topside 113 of the platform 110. The desired offset may be a relatively short distance and may be configured to promote a desired level of cooling of the topside 113 of the platform 110 given anticipated operating characteristics of the turbine engine and required cooling levels. It will be appreciated that the closeness of these cooling apertures 156 to the topside 113 of the platform may allow this region sufficient cooling without the use of film cooling aperture 166. This advantage may eliminate or reduce the need for film cooling in this area, which may reduce or eliminate the aerodynamic losses associated with this type of cooling strategy.

In certain embodiments, the manifold 162 may extend linearly and in an approximate circumferential direction from the pressure side slashface 126 to the suction side slashface 122. The path of the manifold 162 may be predetermined such that the manifold 162 bisects or forms a connection with the pocket 160 along the way. The manifold 162 may be configured such that it resides just inboard of the topside 113 of the platform 110. In certain embodiments, the manifold 162 may be configured to extend approximately linearly from a first end, which is disposed near the suction side slashface 122, to the second end, which is disposed near the pressure side slashface 126. The manifold 162 may be configured to have a longitudinal axis that is approximately parallel to the planar topside 113.

In certain embodiments, the manifold 162 may extend parallel to the aft edge 121 of the platform 110. The manifold 162 may extend in spaced relation to the aft edge 121 of the platform 110. The spaced offset from the aft edge 121 may be a relatively short distance. In certain embodiments, the manifold 162 may include a circumferential axial length of at least 0.75 of the circumferential length of the aft edge 121 of the platform 110.

In certain embodiments, the manifold 162 may extend from the pressure side slashface 126, where the manifold 162 includes a pressure side outlet 182. The pressure side outlet 182 may include a port formed in the pressure side slashface 126. The manifold 162 may extend from the suction side slashface 122, where the manifold 162 includes a suction side outlet 181. The suction side outlet 181 may include a port formed in the suction side slashface 122. In certain embodiments, the suction side outlet 181 may include a non-integral plug 138 that reduces the cross-sectional flow area of the suction side outlet 181. The pressure side outlet 182 also may include a non-integral plug 138 that reduces the cross-sectional flow area of the pressure side outlet 182. The non-integral plug 138 of the suction side outlet 181 may be configured to provide a predetermined cross-sectional flow area through the suction side outlet 181 that, given anticipated operating conditions, corresponds to a desired coolant impingement characteristic. The non-integral plug 138 of the pressure side outlet 182 may be configured to provide a predetermined cross-sectional flow area through the pressure side outlet 182 that, given anticipated operating conditions, corresponds to a desired coolant impingement characteristic during operation. The plug 138 may include any suitable material, and may be welded, mechanically retained, or brazed into proper position. The desired coolant impingement characteristic may depend upon required cooling within the formed slashface cavities between neighboring rotor blades.

In certain embodiments, the cooling apertures 156 may include apertures that connect to the manifold 162 and extend to ports formed on the aft edge 121 of the platform 110. The cooling apertures 156 also may include apertures that connect to the pocket 160 and extend to ports formed on the suction side slashface 122 of the platform 110. In certain embodiments, a plurality of ports may be spaced along an aft half of the suction side slashface 122 of the platform 110. Each of the ports spaced along the aft half of the suction side slashface 122 may correspond to a cooling aperture 156 that connects the port to the pocket 160. A plurality of ports may be spaced along the aft edge 121 of the platform 110. Each of the ports spaced along the aft edge 121 of the platform may correspond to a cooling aperture 156 connecting the port to the manifold 162. In certain embodiments, at least 3 ports may be spaced along the aft half of the suction side slashface 122 of the platform and at least 7 ports may be spaced along the aft edge 121 of the platform 110. The cooling apertures 156 connecting the ports spaced along the suction side slashface 122 to the pocket 160 may extend linearly in an approximate circumferential direction. The cooling apertures 156 connecting the ports spaced along the aft edge 121 of the platform to the manifold 162 may extend linearly in an approximate axial direction.

In certain embodiments, a plurality of film cooling apertures 166 may extend in linear fashion from an outlet formed through the topside 113 of the platform 110 to a connection made with the manifold 162 or the pocket 126. These may be used to augment cooling as required in certain areas of the topside 113.

The root 104 may include a dovetail 109 that engages a groove formed within the rotor wheel. Outboard of the dovetail 109, the root 104 may include a shank 112 that spans between the dovetail 109 and the platform 110. The shank 112 may include an upstream wall 172 and a downstream wall 171, as illustrated in FIG. 6. In general, the shank cavity 119 is a large cavity formed inboard of an overhanging portion of the suction side of the platform 110. The shank cavity 119 is axially defined by an inner surface 174 of the upstream wall 172 of the shank 112 and an inner surface 173 of the downstream wall 171 of the shank 112. With this type of configuration, the rotor blade may be configured such that, upon installation, the rotor blade desirably engages or contacts a neighboring rotor blade along the suction side slashface 122 of the platform 110, and along an edge of the upstream wall 172 and the downstream wall 171 of the shank 112. The desirable engagement of the neighboring rotor blades may form a combined shank cavity 119 between the neighboring rotor blades. The combined shank cavity 119 may be substantially enclosed once the engagement is complete. As described above, the shank cavity 119 may include a port through which a compressed coolant is supplied. The coolant may fill the shank cavity 119, thereby cooling it during operation. The coolant in the shank cavity 119 may enter the platform cooling configuration of the present invention via the mouth of the pocket 160, as described above.

The present invention further provides a manufacturing method by which the cooling systems and configurations described above may be efficiently and effectively manufactured. As an initial step, the pocket 126 may be formed. This may be done via a machining process, such as machining an existing rotor blade, or a casting process, such as casting within a new rotor blade. The pocked 160 may have the features as described above. Second, the manifold 162 may be formed. In certain embodiments, the aft manifold 162 is drilled. In this case, the manifold 162 may be formed by drilling a long, large diameter circular hole, which may be done either blind from one side, or, formed from pressure side to suction side. It will be appreciated that one of the advantages of forming the manifold 162 via drilling (as opposed to casting) is the very tight tolerances that may be achieved with drilling. The tight tolerance, may allow the manifold 162 to be positioned very close to the aft edge 121 of the platform 110, thereby enhancing the cooling of this area. The forming of the pocket 126 and the aft manifold 162 may be done such that they desirably intersect, as described above.

Another step may include closing off the open ends of the manifold 162 that might be formed on the suction side slashface 122, the pressure side slashface 126 or both during the formation of the manifold 162 (depending on how the manifold 162 was formed). These openings may be closed using one or more plugs 138. The plugs 138 may be configured to close off these openings entirely, or reduce the cross-sectional flow area of the each so that flow therethrough is desirably metered or impinged. The plug 138 may be brazed or welded into place. Another step includes the forming of the cooling apertures 156. These may be efficiently formed via drilling/machining processes. As stated, the cooling apertures 156 may reside slightly beneath and mostly parallel to the topside 113 of the platform 110. In this manner, the topside 113 may be sufficiently cooled so that the need for film cooling holes is eliminated or reduced, which will reduce the aerodynamic losses that are caused by their presence. As described the cooling apertures 156 may be fed from the pocket 160 or the manifold 162. As an alternative, a limited number of film cooling apertures 166 also may be formed through the topside 113 of the platform 110.

In other embodiments, the method of the present invention may be used to retrofit an existing rotor blade with a modified platform cooling configuration. The steps of this method may include: 1) machining a pocket 160 in the underside 114 of the platform 110, the pocket 160 including a mouth that fluidly communicates with the shank cavity 119; 2) machining via a drilling process a linear manifold 162, the manifold 162 extending in an approximate circumferential direction from the pressure side slashface 126 to the suction side slashface 122, the linear path of the manifold 162 being predetermined such that the manifold 162 bisects the pocket 160 along the way; 3) machining cooling apertures 156 within the platform 110 that extend from a connection made to the pocket 160 to corresponding ports formed on the suction side slashface 122; and 3) machining cooling apertures 156 within the platform that may extend from a connection made to the manifold 162 to corresponding ports formed in an aft edge 121 of the platform 110. The machining of the manifold 162 may include minimizing the distance between the manifold 162 and the aft edge 121 of the platform 110. The pocket 160 may be machined to include the feed region 190. As described, the feed region 190 of the pocket 160 may include a ceiling portion of the pocket 160. The cooling apertures 156 that connect to ports formed on the suction side slashface 122 may be configured to connect to the feed region 190 of the pocket 160. The outboard position of the feed region 190 may include one of close proximity to the topside 113 of the platform 110. The feed region 190 of the pocket 160 may be configured such that the cooling apertures 156 that connect thereto maintain an approximate constant radial height as the cooling apertures 156 extend toward the ports formed in the suction side slashface 122.

As one of ordinary skill in the art will appreciate, the presently described invention provides an efficient solution for cooling the suction side, and particularly the aft suction side, portion of a turbine rotor blade platform. In addition, a method is described for manufacturing and creating a platform cooling configuration, which may be used to retrofit existing blades with a more advanced or targeted cooling system. Certain embodiments cover strategies by which pressurized coolant from the shank cavity 119 are channeled for cooling the topside of the suction side platform and, particularly, the extreme aft portion of this region, while also minimizing aerodynamic mixing losses. The present invention further provides wide coverage to this typically difficult to cool region. In addition, the present invention is formatted so that it may be efficiently tuned via conveniently machined features so that changing conditions or cooling requirements may be met. In short, the present invention pulls together several strategies to provide cooling systems and methods that effectively provide wide coverage to a difficult and demanding region. What is more, the present cooling solutions may be provided using efficient and low cost/low risk manufacture techniques (as compared to some complex cast features of the prior art), while also being highly tunable, so that, once tested, optimum cooling may be conveniently achieved via machined modifications without the usual re-work of casting tooling.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement for a turbine rotor blade having a platform at an interface between an airfoil and a root, the root including attachment means and, extending between the attachment means and the platform, a shank, wherein, along the side of the platform that corresponds with a suction face of the airfoil, the platform comprises a suction side that includes a topside extending from an airfoil base to a suction side slashface, and wherein the platform overhangs a shank cavity formed in the shank, the platform cooling arrangement comprising:

a pocket formed in an underside region of the platform, the pocket comprising a mouth that receives fluid from the shank cavity;

a manifold extending from a first end near the suction side slashface to a second end near a pressure side slashface of the platform, the manifold including a connection to the pocket near the first end of the manifold; and cooling apertures formed within the platform that extend from a connection made with one of the pocket and the manifold to ports formed within one of the suction side slashface and an aft edge of the platform.

2. The platform cooling arrangement according to claim 1, wherein the cooling apertures include apertures that connect to the manifold and extend to ports formed on the aft edge of the platform; and the cooling apertures include apertures that connect to the pocket and extend to ports formed on the suction side slashface of the platform.

3. The platform cooling arrangement according to claim 2, wherein the manifold extends approximately linearly from the first end, which is disposed near the suction side slashface, to the second end, which is disposed near the pressure side slashface of the platform;

wherein the manifold extends from the first end to the second end in spaced relation to the aft edge of the platform; and wherein the pocket comprises a location inboard of an aft half of the platform.

4. The platform cooling arrangement according to claim 3, wherein the spaced relation comprises a short offset;

wherein the manifold extends approximately parallel to the aft edge of the platform; and wherein the manifold comprises a circumferential axial length of at least 0.75 of the circumferential length of the aft edge of the platform.

5. The platform cooling arrangement according to claim 3, wherein the manifold extends from the pressure side slashface, where the manifold comprises a pressure side outlet, the pressure side outlet comprising a port formed in the pressure side slashface;

wherein the manifold extends from the suction side slashface, where the manifold comprises a suction side outlet, the suction side outlet comprising a port formed in the suction side slashface; and wherein the suction side outlet includes a non-integral plug that reduces the cross-sectional flow area of the suction side outlet, and the pressure side outlet includes a non-integral plug that reduces the cross-sectional flow area of the pressure side outlet.

6. The platform cooling arrangement according to claim 5, wherein the non-integral plug of the suction side outlet is configured to provide a predetermined cross-sectional flow area through the suction side outlet that, given anticipated operating conditions, corresponds to a desired coolant impingement characteristic; and wherein the non-integral plug of the pressure side outlet is configured to provide a predetermined cross-sectional flow area through the pressure side outlet that, given anticipated operating conditions, corresponds to a desired coolant impingement characteristic during operation.

7. The platform cooling arrangement according to claim 3, wherein:
the attachment means of the root includes a dovetail;
the shank includes an upstream wall and a downstream wall;
the shank cavity comprises a large cavity formed inboard of an overhanging portion of the suction side of the platform, the shank cavity being axially defined by an inner surface of the upstream wall of the shank and an inner surface of the downstream wall of the shank.

8. The platform cooling arrangement according to claim 7, wherein, the rotor blade is configured such that, upon installation, the rotor blade desirably engages a neighboring rotor blade along the suction side slashface of the platform, and an edge of the upstream wall and the downstream wall of the shank;
wherein the desirable engagement of the neighboring rotor blades forms a combined shank cavity between the neighboring rotor blades; and
wherein the combined shank cavity is substantially enclosed.

9. The platform cooling arrangement according to claim 3, wherein a plurality of ports are spaced along an aft half of the suction side slashface of the platform, wherein each of the ports spaced along the aft half of the suction side slashface correspond to a cooling aperture that connects the port to the pocket; and
wherein a plurality of ports are spaced along the aft edge of the platform, wherein each of the ports spaced along the aft edge of the platform correspond to a cooling aperture connecting the port to the manifold.

10. The platform cooling arrangement according to claim 9, wherein at least 3 ports are spaced along the aft half of the suction side slashface of the platform and at least 7 ports are spaced along the aft edge of the platform.

11. The platform cooling arrangement according to claim 9, wherein the cooling apertures connecting the ports spaced along the suction side slashface to the pocket extend linearly in an approximate circumferential direction; and
wherein the cooling apertures connecting the ports spaced along the aft edge of the platform to the manifold extend linearly in an approximate axial direction.

12. The platform cooling arrangement according to claim 9, wherein the pocket includes a feed region, the feed region of the pocket comprising a ceiling portion of the pocket that has an outboard position relative to other regions of the pocket;
wherein the plurality of ports spaced along the aft half of the suction side slashface connect, via the cooling apertures, to the feed region of the pocket.

13. The platform cooling arrangement according to claim 12, wherein the outboard position comprises one in close proximity to the topside of the platform; and
wherein the feed region of the pocket is configured such that the cooling apertures that connect thereto maintain an approximate constant radial height as the cooling apertures extend toward the ports formed in the suction side slashface.

14. The platform cooling arrangement according to claim 13, wherein the constant radial height of the cooling apertures corresponds to a desired distance from the topside of the platform, the desired distance comprising one that promotes adequate cooling of the topside of the platform given anticipated operating characteristics.

15. The platform cooling arrangement according to claim 3, wherein the mouth of the pocket is configured to provide a wide opening that fluidly communicates with the shank cavity, and wherein the pocket comprises a smooth, narrowing contour as the pocket extends from the mouth into the rotor blade.

16. The platform cooling arrangement according to claim 15, wherein the pocket extends from the mouth to the feed region, the feed region comprising an outermost radial height of the pocket.

17. The platform cooling arrangement according to claim 3, wherein the pocket, the manifold, and the cooling apertures are configured such that pressurized coolant from the shank cavity is encouraged to enter the cooling arrangement through the pocket, flow from the pocket into the cooling apertures that connect directly to the pocket, flow from the pocket into the manifold, flow from the manifold into the cooling apertures that connect directly to the manifold, and exit the platform through the ports formed along the suction side slashface and the aft edge of the platform.

18. The platform cooling arrangement according to claim 3, further comprising film cooling apertures that connect the pocket to ports formed through the topside of the platform.

19. The platform cooling arrangement according to claim 3, wherein each of the cooling apertures comprise a smaller cross-sectional flow area than the manifold; and
wherein the cooling apertures are linear.

20. The platform cooling arrangement according to claim 12, wherein the cooling apertures and ports are configured such that, given anticipated operating conditions, each exhausts a desired impinged flow of coolant into a slashface cavity that, upon installation, is formed between the turbine rotor blade and a neighboring turbine rotor blades.

21. The platform cooling arrangement according to claim 3, wherein the manifold extends linearly and in an approximate circumferential direction from the pressure side slashface to the suction side slashface, the linear path of the manifold being predetermined such that manifold bisects the pocket along the way.

22. A method of manufacturing a platform cooling arrangement in a turbine rotor blade having a platform at an interface between an airfoil and a root, the root including attachment means and, extending between the attachment means and the platform, a shank, wherein, along the side of the platform that corresponds with a suction face of the airfoil, the platform comprises a suction side that includes a topside extending from an airfoil base to a suction side slashface, and wherein the platform overhangs a shank cavity formed in the shank, the platform cooling arrangement comprising:
forming a pocket in an underside region of the platform, the pocket comprising a mouth that receives fluid from the shank cavity;

machining via a drilling process a manifold, the manifold extending linearly and in an approximate circumferential direction from the pressure side slashface to the suction side slashface, the linear path of the manifold being predetermined such that an offset is maintained from the aft edge of the platform and the manifold bisects the pocket along the way;

machining cooling apertures within the platform that extend from a connection made to the pocket to corresponding ports formed on the suction side slashface; and machining cooling apertures within the platform that extend from a connection made to the manifold to a corresponding ports formed in an aft edge of the platform.

23. The method according to claim 22, wherein the pocket is formed via a casting process;

wherein the pocket comprises a location inboard of an aft half of the platform;

wherein the machining of the manifold includes minimizing the offset between the manifold and the aft edge of the platform; and wherein the pocket includes a feed region, the feed region of the pocket comprising a ceiling portion of the pocket that has an outboard position relative to other regions of the pocket;

wherein the cooling apertures that connect to ports formed on the suction side slashface connect to the feed region of the pocket.

24. The method according to claim 22, wherein the pocket is formed via a machining process;

wherein the pocket comprises a location inboard of an aft half of the platform;

wherein the machining of the manifold includes minimizing the offset between the manifold and the aft edge of the platform; and wherein the pocket includes a feed region, the feed region of the pocket comprising a ceiling portion of the pocket that has an outboard position relative to other regions of the pocket;

wherein the cooling apertures that connect to ports formed on the suction side slashface connect to the feed region of the pocket.

25. The method according to claim 24, wherein the turbine rotor blade comprises an existing turbine rotor blade and the manufacturing the platform cooling arrangement comprises retrofitting the existing turbine rotor blade with the platform cooling arrangement;

wherein the outboard position of the feed region comprises one of close proximity to the topside of the platform; and wherein the feed region of the pocket is configured such that the cooling apertures that connect thereto maintain an approximate constant radial height as the cooling apertures extend toward the ports formed in the suction side slashface.

* * * * *